US011519487B2

(12) United States Patent
Balsiger et al.

(10) Patent No.: US 11,519,487 B2
(45) Date of Patent: Dec. 6, 2022

(54) COMPOUND HARMONIC GEAR MOTOR CONFIGURED FOR CONTINUOUS OUTPUT ROTATION

(71) Applicant: Hamilton Sundstrand Corporation, Charlotte, NC (US)

(72) Inventors: Derick S. Balsiger, Mayer, AZ (US); Keith Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 699 days.

(21) Appl. No.: 16/542,918

(22) Filed: Aug. 16, 2019

(65) Prior Publication Data

US 2021/0048095 A1 Feb. 18, 2021

(51) Int. Cl.
| | |
|---|---|
| *F16H 49/00* | (2006.01) |
| *F16C 19/08* | (2006.01) |
| *F16H 3/02* | (2006.01) |
| *H02K 7/08* | (2006.01) |
| *H02K 7/116* | (2006.01) |

(52) U.S. Cl.
CPC ........... *F16H 49/001* (2013.01); *F16C 19/08* (2013.01); *F16H 3/02* (2013.01); *H02K 7/08* (2013.01); *H02K 7/116* (2013.01); *F16C 2361/00* (2013.01); *F16H 2200/0034* (2013.01)

(58) Field of Classification Search
CPC ...... F16H 49/001; F16H 3/02; F16H 2361/00; F16H 2200/0034; F16C 19/08; H02K 7/08; H02K 7/116
See application file for complete search history.

(56) References Cited

U.S. PATENT DOCUMENTS

| | | | |
|---|---|---|---|
| 7,247,116 B2 | 7/2007 | Stoianovici et al. | |
| 9,157,517 B2 | 10/2015 | Lunin et al. | |
| 9,233,752 B2 | 1/2016 | Walitzki et al. | |
| 2011/0245006 A1* | 10/2011 | Negishi | B25J 9/1025 |
| | | | 74/411 |
| 2012/0204674 A1 | 8/2012 | Lundberg et al. | |
| 2015/0354686 A1* | 12/2015 | Balsiger | H02K 7/116 |
| | | | 74/640 |
| 2017/0108107 A1* | 4/2017 | Balsiger | F16H 49/001 |

(Continued)

FOREIGN PATENT DOCUMENTS

| | | |
|---|---|---|
| EP | 3312475 A2 | 4/2018 |
| JP | 2007155076 A | 6/2017 |
| WO | 2015168793 A2 | 11/2015 |

OTHER PUBLICATIONS

Extended European Search Report; Application No. 19211142.5; dated Jun. 15, 2020; 9 pages.

*Primary Examiner* — Zakaria Elahmadi
(74) *Attorney, Agent, or Firm* — Cantor Colburn LLP

(57) ABSTRACT

Disclosed is a compound harmonic gear motor having: first and second ground gears connected by a stationary shaft; a wave generator including an outer surface that can rotate completely around the stationary shaft, the wave generator including a rotor and a stator, wherein rotation of the rotor causes rotation of the outer surface; a flex spline surrounding the outer surface of the wave generator that is driven to rotate by rotation of the outer surface of the wave generator; and an output flange including internal teeth that mate with the flex spline to cause rotation of the output flange completely around the stationary shaft.

17 Claims, 3 Drawing Sheets

(56) References Cited

U.S. PATENT DOCUMENTS

| | | | |
|---|---|---|---|
| 2017/0184190 A1* | 6/2017 | Klassen | F16H 49/001 |
| 2017/0201154 A1* | 7/2017 | Brassitos | H02K 9/10 |
| 2018/0112760 A1* | 4/2018 | Balsiger | B64C 13/34 |
| 2018/0172080 A1* | 6/2018 | Jackowski | B25J 19/06 |
| 2018/0283503 A1* | 10/2018 | Georgiev | F16H 1/28 |
| 2019/0011032 A1* | 1/2019 | Balsiger | F16H 49/001 |
| 2019/0072172 A1* | 3/2019 | Ottersbach | F16H 49/001 |
| 2019/0089224 A1* | 3/2019 | Hatani | H02K 21/14 |

\* cited by examiner

COMPOUND HARMONIC GEAR MOTOR CONFIGURED FOR CONTINUOUS OUTPUT ROTATION

BACKGROUND

Exemplary embodiments pertain to the art of geared motors and more specifically to a compound harmonic gear motor configured for continuous output rotation.

Compound harmonic gear motors enable achieving a high power density. Such geared motors may be used in machinery requiring high torque output at low speeds. Such geared motors may also be compact and lightweight.

BRIEF DESCRIPTION

Disclosed is a compound harmonic gear motor comprising: first and second ground gears connected by a stationary shaft; a wave generator including an outer surface that can rotate completely around the stationary shaft, the wave generator including a rotor and a stator, wherein rotation of the rotor causes rotation of the outer surface; a flex spline surrounding the outer surface of the wave generator that is driven to rotate by rotation of the outer surface of the wave generator; and an output flange including internal teeth that mate with the flex spline to cause rotation of the output flange, wherein the output flange is configured to rotate completely around the stationary shaft.

In addition to one or more of the above disclosed aspects or as an alternate, the motor includes the stator is connected to the stationary shaft, wherein the wave generator carries the rotor and the rotor that rotates relative to the stator when the stator is energized.

In addition to one or more of the above disclosed aspects or as an alternate, the motor includes a rolling bearing, the rolling bearing including: an inner race connected to the wave generator; an outer race connected to the flex spline; and rolling elements between the inner race and the outer race.

In addition to one or more of the above disclosed aspects or as an alternate, the motor includes a first ground gear that comprises the stationary shaft.

In addition to one or more of the above disclosed aspects or as an alternate, the first ground gear includes a first radial surface extending from a first axial end of the stationary shaft and a first annular surface extending toward the output flange from the first radial surface; and the gear motor further comprises a second ground gear that includes a second radial surface connected to a second axial end of the stationary shaft and a second annular surface extending toward the output flange from the second radial surface, wherein the first ground gear and the second ground gear, when connected, form a gear motor enclosure.

In addition to one or more of the above disclosed aspects or as an alternate, the second radial surface includes an opening that forms a keyway and the second axial end of the stationary shaft is configured as a key.

In addition to one or more of the above disclosed aspects or as an alternate, the flex spline includes a plurality of splines that are outer facing, including an output spline, a first ground spline on one side of the output spline and a second ground spline on another side of the output spline so that the second ground spline is axially offset from the first ground spline, and the output spline that is axially between the first ground spline and the second ground spline, whereby the flex spline is configured as a compound spline.

In addition to one or more of the above disclosed aspects or as an alternate, the output flange includes output gear teeth that mesh with the output spline, the first annular surface of the first ground gear includes first ground gear teeth that mesh with the first ground spline, and the second annular surface of the second ground gear includes second ground gear teeth that mesh with the second ground spline.

In addition to one or more of the above disclosed aspects or as an alternate, the first ground spline and the first ground gear teeth are configured to mesh to thereby form a first gear ratio, and the output spline and the output gear teeth are configured to mesh to thereby form a second gear ratio that differs from the first gear ratio to form a compound gear ratio.

In addition to one or more of the above disclosed aspects or as an alternate, the second ground spline and the second ground gear teeth are configured to mesh and form a gear ratio that is the same as the first gear ratio.

In addition to one or more of the above disclosed aspects or as an alternate, the motor includes a plurality of support bearings that are axially opposing and include: a first support bearing located between a first axial end of the wave generator and a first inner corner of the first ground gear; and a second support bearing located between a second axial end of the wave generator and a second inner corner of the second ground gear.

In addition to one or more of the above disclosed aspects or as an alternate, the first axial end of the wave generator includes a first radial offset portion that forms a first bearing seat for the first support bearing; and the second axial end of the wave generator includes a second radial offset portion that forms a second bearing seat for the second support bearing.

In addition to one or more of the above disclosed aspects or as an alternate, the first annular surface of the first ground gear is securely positioned against one side of the output flange, and the second annular surface of the second ground gear is securely positioned against another side of the output flange, to thereby form the gear motor enclosure against the output flange.

In addition to one or more of the above disclosed aspects or as an alternate, the second axial end of the stationary shaft includes a threaded tip configured to receive a nut to secure the first ground gear and the second ground gear to one another, thereby securing the gear motor enclosure against the output flange.

In addition to one or more of the above disclosed aspects or as an alternate, the output flange comprises a first set of mounting surfaces.

In addition to one or more of the above disclosed aspects or as an alternate, the first set of mounting surfaces are through-holes.

In addition to one or more of the above disclosed aspects or as an alternate, the second radial surface of the second ground gear includes a second set of mounting surfaces.

In addition to one or more of the above disclosed aspects or as an alternate, the second set of mounting surfaces are threaded blind holes.

Disclosed is a method of operating a compound harmonic gear motor, comprising: driving an outer surface of a wave generator to rotate completely around a stationary shaft of the gear motor, the wave generator including a rotor and a stator, wherein rotation of the rotor causes rotation of the outer surface; driving a flex spline by rotation of the outer surface of the wave generator, the flex spline surrounding the outer surface of the wave generator that is driven to rotate by rotation of the outer surface of the wave generator; and driving an output flange, by rotation of the flex spline, whereby the output flange rotates completely around the stationary shaft, the output flange including internal teeth that mate with the flex spline to cause rotation of the output flange.

In addition to one or more of the above disclosed aspects or as an alternate, the method includes energizing the stator that is connected to the stationary shaft within the gear motor; and driving the rotor with the stator when energized, the rotor being connected to the outer surface of the wave generator, to thereby rotate the outer surface of the wave generator completely around the stationary shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Compound harmonic gear motors may enable achieving a relatively high power density. Known compound harmonic gears, however, have a limited range of rotational motion. In view of such limitations, the disclosed embodiments provide a compound harmonic gear motor configured for continuous output rotation. Benefits of the disclosed compound harmonic gear motor include broader and more efficient application with earth moving equipment, power tools, robot end effectors, power steering gear motors, power lift gates, and the like.

Figure 1:
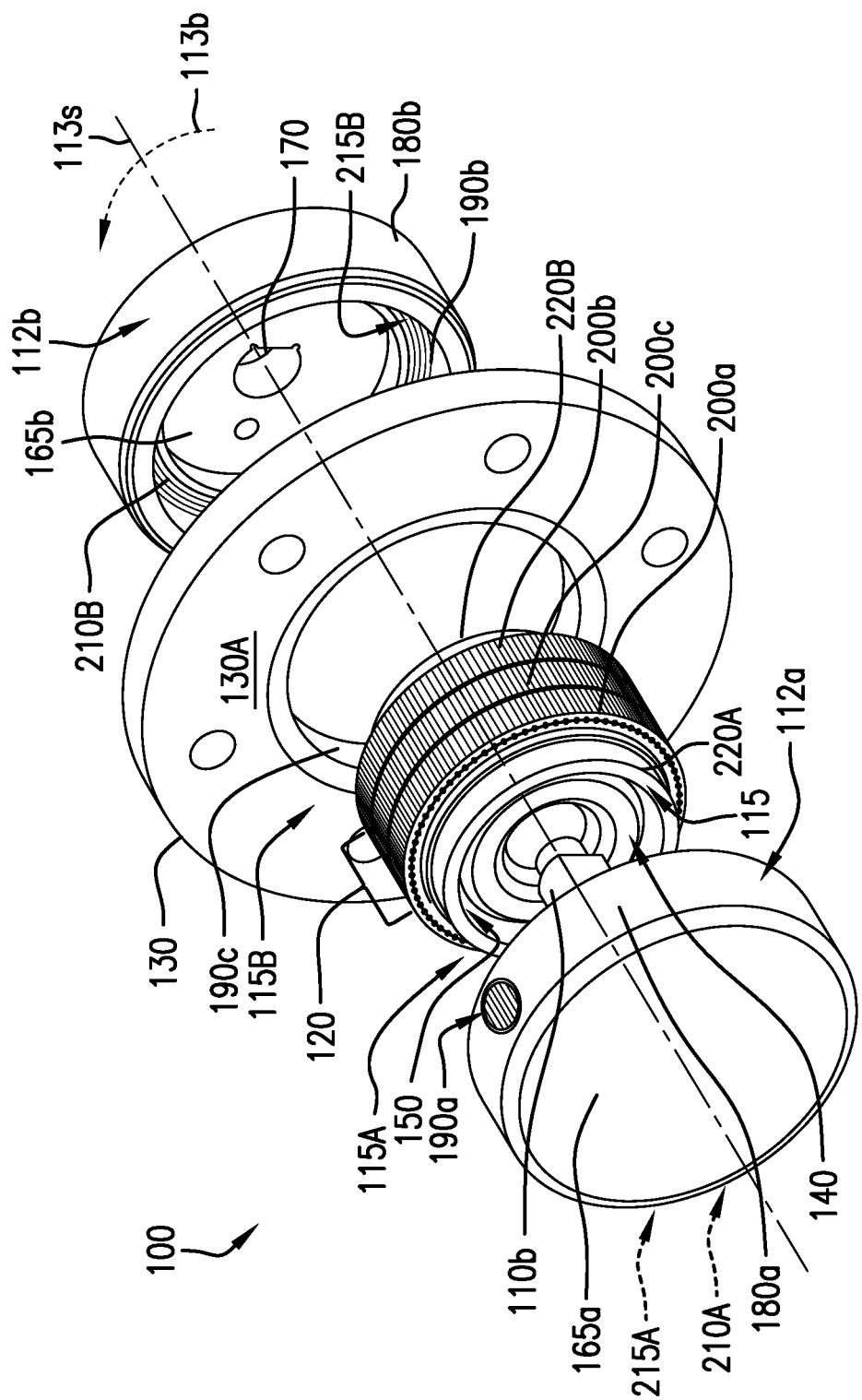
FIG. 1 is an exploded view of a compound harmonic gear motor according to an embodiment.
Figure 3:
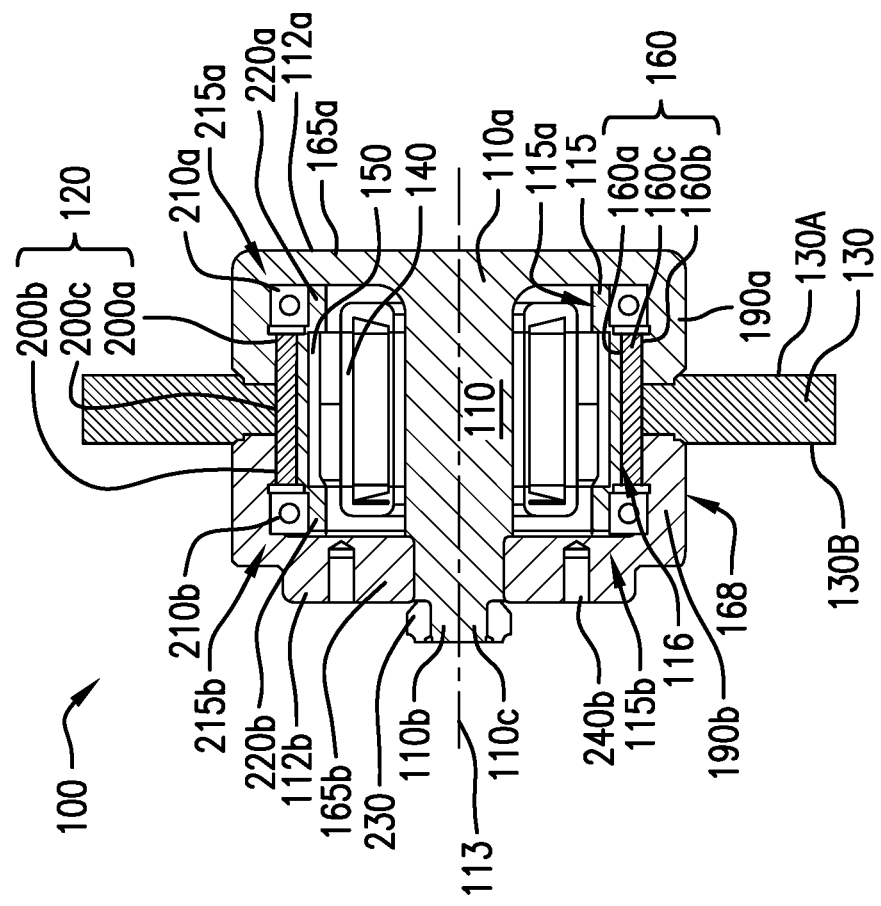
FIG. 3 is a cross sectional view, along lines 3-3 in FIG. 2, of a compound harmonic gear motor according to an embodiment.
Figure 2:
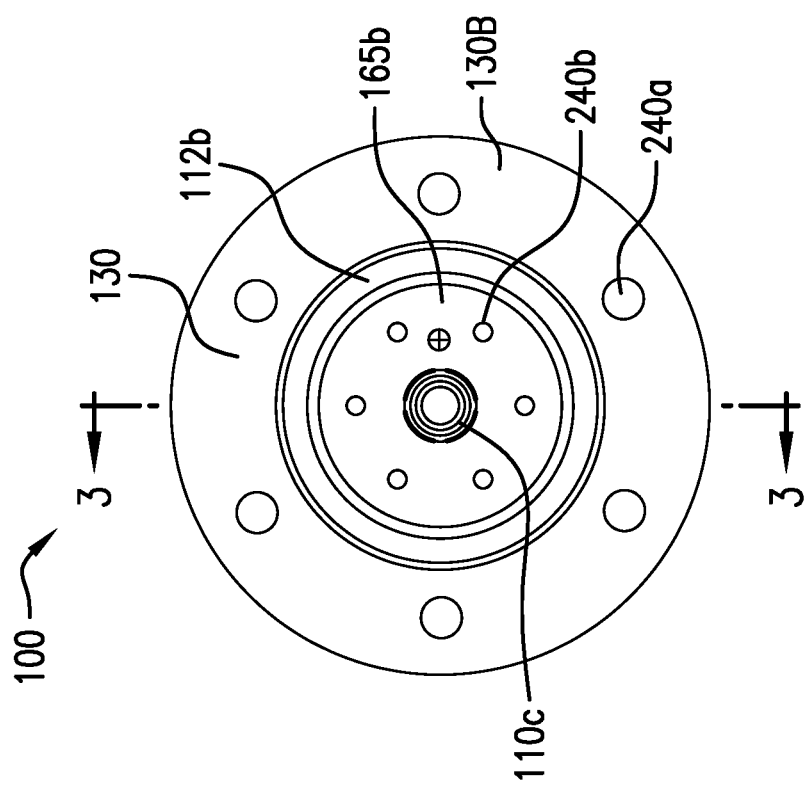
FIG. 2 is a front view of a compound harmonic gear motor according to an embodiment.

Turning to FIGS. 1-3, disclosed is a compound harmonic gear motor (gear motor) 100. The gear motor 100 includes a stationary shaft 110. The stationary shaft 110 is fixed in place by a plurality of ground gears 112. For example, a first ground gear 112A and a second ground gear 112B are axially spaced from one another along a gear motor center axis 113. In one embodiment, the stationary shaft 110 is formed as a part of the first ground gear 112A. The stationary shaft 110 joins the first and second ground gears 112A, 112B.

A wave generator 115 includes an outer surface 116 that is configured to rotate completely about a rotational axis 113 (or in the opposing direction), about the stationary shaft 110. That is, the outer surface 116 of the wave generator 115 can rotate at least 360 degrees about the stationary shaft 110. The gear motor 100 includes a flex spline 120. The flex spline 120 is rotationally driven by the outer surface 116 of the wave generator 115. An output flange 130 is driven to rotate by a portion of the flex spline 120, as will be explained in further detail below. From this configuration, the output flange 130 is configured to rotate completely about the stationary shaft 110.

The gear motor 100 includes a stator 140. The stator 140 is connected to the stationary shaft 110. The gear motor 100 also includes a rotor 150. The rotor 150 is connected to the wave generator 115 so that the wave generator 115 carries the rotor 150. In the disclosed embodiments, the stator 140 would contain typical motor coil windings configured for being energized. The rotor 150 would contain a permanent magnet set. Further, in the disclosed embodiments, the stationary shaft 110 is stationary.

Energizing the coil windings about the stator 140 would cause the rotor 150 to rotate. This would rotate the outer surface 116 of the wave generator 115 about the stationary shaft 110. This rotation would drive the flex spline 120 to rotate. Rotation of the flex spline 120, as indicated, would rotate the output flange 130.

The gear motor 100 includes a rolling bearing 160 (FIG. 3). The rolling bearing 160 includes an inner race 160A. The inner race 160A is connected to the outer surface 116 of the wave generator 115. An outer race 160B is connected to the flex spline 120. Rolling elements 160C are disposed between the inner race 160A and the outer race 160B. As can be appreciated the rolling elements 160C enable relative movement between the inner race 160A and the outer race 160B.

The first ground gear 112A includes a first radial surface 165A. The first radial surface 165A extends radially outward from a first axial end 110A of the stationary shaft 110. The second ground gear 112B includes a second radial surface 165B. The second radial surface 165B connects to a second axial end 110B of the stationary shaft 110. The first ground gear 112A includes a first annular surface 180A. The first annular surface 180A extends from the first radial surface 165A toward the output flange 130. The second ground gear 112B includes a second annular surface 180B. The second annular surface 180B extends from the second radial surface 165B toward the output flange 130. With this configuration, the first ground gear 112A and the second ground gear 112B, when connected, form a gear motor enclosure 168.

The second radial surface 165B includes an opening 170. The opening 170 forms a keyway. The second axial end 110B of the stationary shaft 110 forms a key. This configuration prevents relative rotational motion between the ground gears 112 when connected.

The flex spline 120 includes a plurality of splines 200 to thereby form a compound spline. For example, the flex spline 120 includes a first ground spline 200A, a second ground spline 200B and an output spline 200C. The second ground spline 200B is axially offset from the first ground spline 200A. The output spline 200C is axially intermediate the first ground spline 200A and the second ground spline 200B. Each of the first ground spline 200A, the second ground spline 200B and the output spline 200C are outer facing splines.

The first annular surface 180A includes first ground gear teeth 190A. The first ground gear teeth 190A mesh with the first ground spline 200A. The second annular surface 180B includes second ground gear teeth 190B. The second ground gear teeth 190B mesh with the second ground spline 200B. The output flange 130 includes output gear teeth 190C. The output gear teeth 190C mesh with the output spline 200C. Each of the first ground gear teeth 190A, the second ground gear teeth 190B and the output gear teeth 190C are inner facing teeth.

The plurality of splines 200 are configured to mesh with the ground gears 112 and the output flange 130 according to different gear ratios. The first ground spline 200A and the first ground gear teeth 190A have a first gear ratio (Ratio 1, below). The second ground spline 200B and the second ground gear teeth 190B also have the first gear ratio. The output spline 200C and the output gear teeth 190C have a second gear ratio (Ratio 2, below) that differs from the first gear ratio. The splines 200 are integral to same structure, that is, the flex spline 120. Thus the different gear ratios together form a compound gear ratio (Compound Ratio, below). The compound gear ratio provides a differential motion between the ground gears 112 and the output flange 130.

The compound gear ratio is represented as the difference of the individual gear ratios:

$$\text{Ratio } 1 = \frac{\text{Teeth in Output Spline } (200c)}{\text{Teeth in Output Spline } (200c) - \text{Teeth in Outpt Flange } (190c)}$$

$$\text{Ratio } 2 = \frac{\text{Teeth in First Ground Spline } (200a)}{\text{Teeth in First Ground Spline } (200a) - \text{Teeth in First Ground Gear } (112a)}$$

$$\text{Compound Ratio} = \frac{1}{\frac{1}{\text{Ratio } 1} - \frac{1}{\text{Ratio } 2}}$$

The gear motor 100 further includes a plurality of support bearings 210. The plurality of support bearings 210 include a first support bearing 210A and a second support bearing 210B. The plurality of support bearings 210 are positioned at axially opposing locations in the gear motor 100. The first support bearing 210A is disposed between a first axial end 115A of the outer surface 116 of the wave generator 115 and a first inner corner 215A of the first ground gear 112A. The second support bearing 210B is disposed between a second axial end 115B of the outer surface 116 of the wave generator 115 and a second inner corner 215B of the second ground gear 112B. According to a disclosed embodiment, the plurality of support bearings 210 are ball bearings.

The first axial end 115A of the wave generator 115 includes a first radial offset portion 220A. The first radial offset portion 220A forms a first bearing seat for the first support bearing 210A. The second axial end 115B of the wave generator 115 includes a second radial offset portion 220B. The second radial offset portion 220B forms a second bearing seat for the second support bearing 210B.

The first annular surface 180A of the first ground gear 112A is securely positioned against one side 130A of the output flange 130. The second annular surface 180B of the second ground gear 112B is securely positioned against another side 130B of the output flange 130. The second axial end 110B of the stationary shaft 110 includes a threaded tip 110C. The threaded tip 110C is configured to receive a nut 230. The nut 230 secures the first ground gear 112A and the second ground gear 112B to one another. This configuration forms and secures the gear motor enclosure 168 against the output flange 130.

The output flange 130 comprises a first set of mounting surfaces 240A. The first set of mounting surfaces 240A are through-holes. The first set of mounting surfaces 240A connects the gear motor 100 to an external stationary structure. The second radial surface 165B of the second ground gear 112B includes a second set of mounting surfaces 240B. The second set of mounting surfaces 240B are threaded blind holes. The second set of mounting surfaces 240B connects the gear motor 100 to an external movable structure. From this configuration an external movable structure may rotate relative to an external stationary structure. Such external stationary structure and external movable structure may be components of, for example, earth moving equipment, power tools, robot end effectors, power steering gear motors, power lift gates, and the like.

Figure 4:
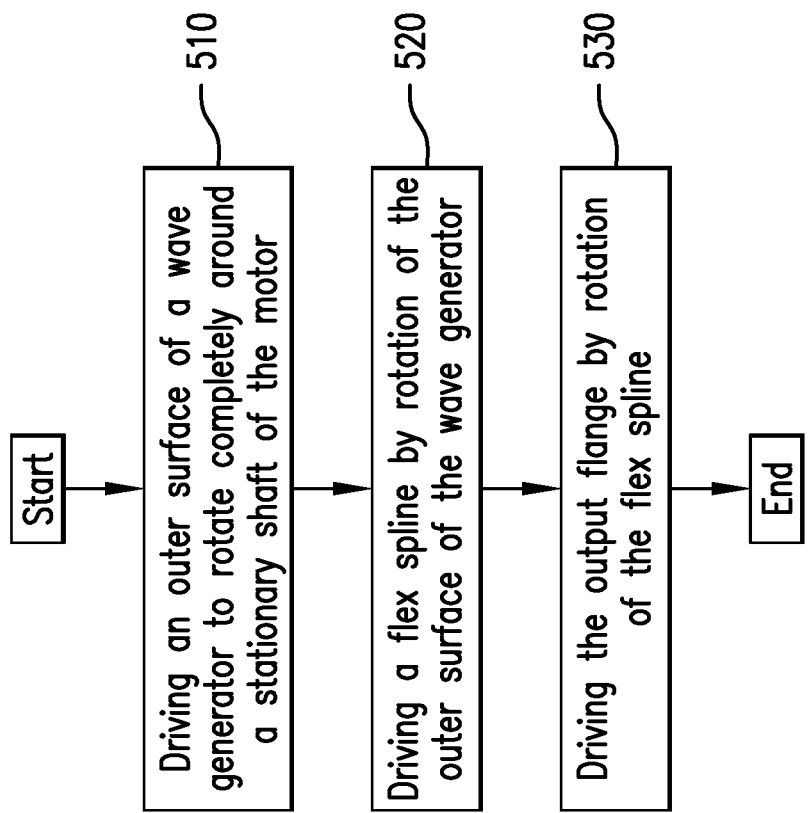
FIG. 4 is a flowchart of a portion of a method of operating a compound harmonic gear motor according to a disclosed embodiment.

Turning to FIG. 4, a flowchart shows a portion of a method of operating the gear motor 100. As illustrated in block 510, the method includes driving the outer surface 116 of the wave generator 115 to rotate completely around the stationary shaft 110 of the gear motor 100. As illustrated in block 520 the method includes driving the flex spline 120 by rotation of the outer surface 116 of the wave generator 115. As illustrated in block 530 the method further includes driving the output flange 130 by rotation the flex spline 120. From this configuration the output flange 130 rotates completely about the stationary shaft 110 of the gear motor 100.

Figure 5:
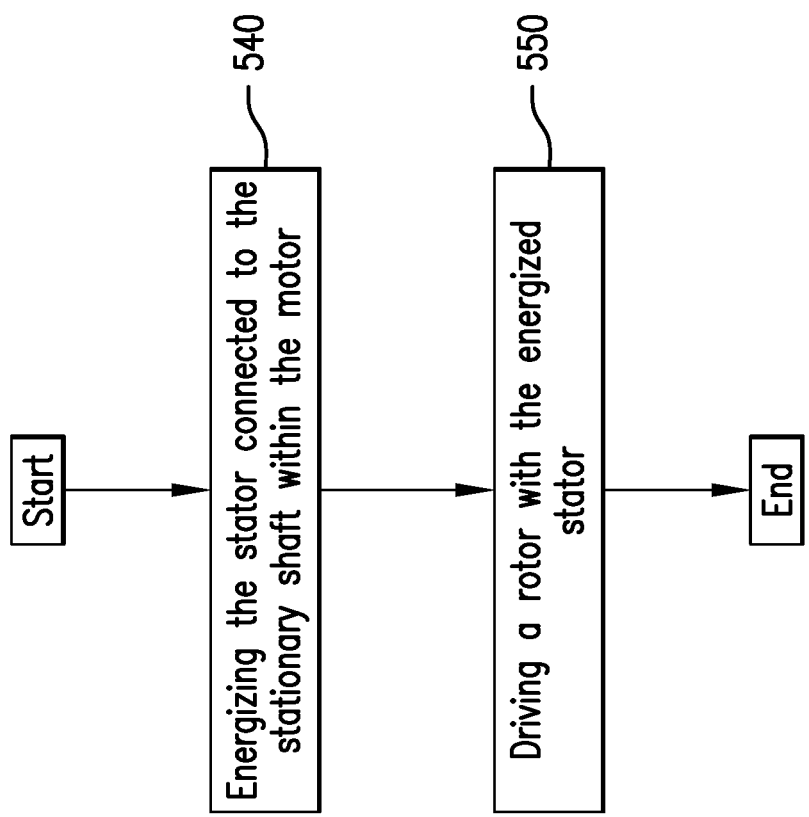
FIG. 5 is a flowchart of another portion of a method of operating a compound harmonic gear motor according to a disclosed embodiment.

Turning to FIG. 5 a flowchart shows another portion of the method of operating the gear motor 100. Specifically, the flowchart of FIG. 5 shows additional details for the method of driving the outer surface 116 of the wave generator 115 (block 510 in FIG. 4). As illustrated in block 540 the method includes energizing a stator 140 connected to the stationary shaft 110 within the gear motor 100. As illustrated in block 550, the method includes driving a rotor 150 with the stator 140 when energized. From this configuration, the outer surface 116 of the wave generator 115 is driven to rotate relative to the stationary shaft 110 of the gear motor 100. With such operation of the gear motor 100, the gear motor 100 may be utilized with earth moving equipment, power tools, robot end effectors, power steering gear motors, power lift gates, and the like.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compound harmonic gear motor comprising:
   first and second ground gears connected by a stationary shaft;
   a wave generator including an outer surface that can rotate completely around the stationary shaft, the wave generator including a rotor and a stator, wherein rotation of the rotor causes rotation of the outer surface;
a flex spline surrounding the outer surface of the wave generator that is driven to rotate by rotation of the outer surface of the wave generator; and
an output flange including internal teeth that mate with the flex spline to cause rotation of the output flange, wherein the output flange is configured to rotate completely around the stationary shaft,
wherein:
the first ground gear includes a first radial surface extending from a first axial end of the stationary shaft and a first annular surface extending toward the output flange from the first radial surface; and
the second ground gear that includes a second radial surface connected to a second axial end of the stationary shaft and a second annular surface extending toward the output flange from the second radial surface,
wherein the first ground gear and the second ground gear, when connected, form a gear motor enclosure; and
the first annular surface of the first ground gear is securely positioned against one side of the output flange, and the second annular surface of the second ground gear is securely positioned against another side of the output flange, to thereby form the gear motor enclosure against the output flange,
wherein the output flange comprises a first set of mounting surfaces, and the second radial surface of the second ground gear includes a second set of mounting surfaces, the second set of mounting surfaces.

2. The gear motor of claim 1, comprising:
the stator is connected to the stationary shaft; and
wherein the wave generator carries the rotor and the rotor that rotates relative to the stator when the stator is energized.

3. The gear motor of claim 2, further comprising a rolling bearing, the rolling bearing including:
an inner race connected to the wave generator;
an outer race connected to the flex spline; and
rolling elements between the inner race and the outer race.

4. The gear motor of claim 3, further including a first ground gear that comprises the stationary shaft.

5. The gear motor of claim 1, wherein the second radial surface includes an opening that forms a keyway and the second axial end of the stationary shaft is configured as a key.

6. The gear motor of claim 5, wherein the flex spline includes a plurality of splines that are outer facing, including an output spline, a first ground spline on one side of the output spline and a second ground spline on another side of the output spline so that the second ground spline is axially offset from the first ground spline, and the output spline that is axially between the first ground spline and the second ground spline, whereby the flex spline is configured as a compound spline.

7. The gear motor of claim 6, wherein the output flange includes output gear teeth that mesh with the output spline, the first annular surface of the first ground gear includes first ground gear teeth that mesh with the first ground spline, and the second annular surface of the second ground gear includes second ground gear teeth that mesh with the second ground spline.

8. The gear motor of claim 7, wherein the first ground spline and the first ground gear teeth are configured to mesh to thereby form a first gear ratio, and the output spline and the output gear teeth are configured to mesh to thereby form a second gear ratio that differs from the first gear ratio to form a compound gear ratio.

9. The gear motor of claim 8, wherein the second ground spline and the second ground gear teeth are configured to mesh and form a gear ratio that is the same as the first gear ratio.

10. The gear motor of claim 9, further comprising a plurality of support bearings that are axially opposing and include:
a first support bearing located between a first axial end of the wave generator and a first inner corner of the first ground gear; and
a second support bearing located between a second axial end of the wave generator and a second inner corner of the second ground gear.

11. The gear motor of claim 10, wherein:
the first axial end of the wave generator includes a first radial offset portion that forms a first bearing seat for the first support bearing; and
the second axial end of the wave generator includes a second radial offset portion that forms a second bearing seat for the second support bearing.

12. The gear motor of claim 1, wherein the second axial end of the stationary shaft includes a threaded tip configured to receive a nut to secure the first ground gear and the second ground gear to one another, thereby securing the gear motor enclosure against the output flange.

13. The gear motor of claim 1, wherein the output flange comprises a first set of mounting surfaces.

14. The gear motor of claim 13, wherein the first set of mounting surfaces are through-holes.

15. The gear motor of claim 1, wherein the second set of mounting surfaces are threaded blind holes.

16. A method of operating a compound harmonic gear motor that includes:
first and second ground gears connected by a stationary shaft;
a wave generator including an outer surface that can rotate completely around the stationary shaft,
the wave generator including a rotor and a stator,
wherein rotation of the rotor causes rotation of the outer surface;
a flex spline surrounding the outer surface of the wave generator that is driven to rotate by rotation of the outer surface of the wave generator; and
an output flange including internal teeth that mate with the flex spline to cause rotation of the output flange, wherein the output flange is configured to rotate completely around the stationary shaft,
wherein:
the first ground gear includes a first radial surface extending from a first axial end of the stationary shaft and a first annular surface extending toward the output flange from the first radial surface; and
the second ground gear that includes a second radial surface connected to a second axial end of the stationary shaft and a second annular surface extending toward the output flange from the second radial surface,
wherein the first ground gear and the second ground gear, when connected, form a gear motor enclosure; and
the first annular surface of the first ground gear is securely positioned against one side of the output flange, and the second annular surface of the second ground gear is securely positioned against another side of the output flange, to thereby form the gear motor enclosure against the output flange, wherein the output flange comprises a first set of mounting surfaces, and the second radial surface of the second ground gear includes a second set of mounting surfaces, the second set of mounting surfaces, the method, comprising:

driving the outer surface of the wave generator to rotate completely around the stationary shaft of the gear motor;

driving the flex spline by rotation of the outer surface of the wave generator; and driving the output flange, by rotation of the flex spline, whereby the output flange rotates completely around the stationary shaft.

17. The method of claim 16, comprising:

energizing the stator that is connected to the stationary shaft within the gear motor; and driving the rotor with the stator when energized, the rotor being connected to the outer surface of the wave generator, to thereby rotate the outer surface of the wave generator completely around the stationary shaft.

* * * * *